(12) United States Patent
Niida

(10) Patent No.: US 6,490,407 B2
(45) Date of Patent: *Dec. 3, 2002

(54) RECORDING AND REPRODUCTION OF MIXED MOVING AND STILL IMAGES

(75) Inventor: Mitsuo Niida, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,581

(22) Filed: May 22, 1997

(65) Prior Publication Data

US 2002/0044766 A1 Apr. 18, 2002

(30) Foreign Application Priority Data

May 22, 1996 (JP) .............................................. 8-127094

(51) Int. Cl.[7] ............................ H04N 5/76; H04N 5/225
(52) U.S. Cl. ......................... 386/69; 386/120; 348/220
(58) Field of Search ................................. 386/1, 38, 95, 386/107, 108, 117, 120, 68–70, 81–82; 348/220; 358/909.1, 906; H04N 5/76, 5/225

(56) References Cited

U.S. PATENT DOCUMENTS

| | | | |
|---|---|---|---|
| 4,612,569 A | * | 9/1986 | Ichinose ........................ 369/83 |
| 4,856,004 A | * | 8/1989 | Foster et al. .................. 714/759 |
| 5,712,680 A | * | 1/1998 | Hieda ........................... 348/220 |
| 5,809,208 A | * | 9/1998 | Komori ......................... 386/120 |
| 5,875,280 A | * | 2/1999 | Takaiwa et al. ............... 386/120 |

* cited by examiner

Primary Examiner—Thai Tran
(74) Attorney, Agent, or Firm—Fitzpatrick, Cella, Harper & Scinto

(57) ABSTRACT

Image data is reproduced from a recording medium where moving-image data and still-image data are recorded, and the reproduced image data is stored in a memory. The memory can store still-image data for a plurality of different picture frames, and selectively reads the still-image data for the plurality of picture frames stored in the memory.

15 Claims, 12 Drawing Sheets

| HEADER | DEFINITION |
|---|---|
| "00h" | STILL-PICTURE LEADING FLAG |
| "01h" | STILL-PICTURE CONTINUING FLAG |
| "02h" | STILL-PICTURE ENDING FLAG |
| OTHER | RESERVED (DUMMY DATA) |

FIG.5

| TYPE | BANK |
|---|---|
| VM(Y) | BANK 0 |
| VM(Cr) | BANK 0 |
| VM(Cb) | BANK 0 |

| TYPE | BANK |
|---|---|
| VM(Y) | BANK 1 |
| VM(Cr) | BANK 1 |
| VM(Cb) | BANK 1 |

| TYPE | BANK |
|---|---|
| TM | BANK 0 |
| TM | BANK 1 |
| TM | BANK 2 |

FIG.11

| TYPE | BANK |
|---|---|
| VM(Y) | BANK 0 |
| VM(Cr) | BANK 0 |
| VM(Cb) | BANK 0 |

| TYPE | BANK |
|---|---|
| TM | BANK 3 |
| TM | BANK 4 |
| TM | BANK 5 |
| VACANT REGION | |

| TYPE | BANK |
|---|---|
| TM | BANK 0 |
| TM | BANK 1 |
| TM | BANK 2 |

RECORDING AND REPRODUCTION OF MIXED MOVING AND STILL IMAGES

BACKGROUND OF THE INVENTION

1. Field of the Invention

This invention relates to an apparatus for reproducing image data, and more particularly, to an operation of reproducing a still image from a recording medium in which moving images and still images are recorded.

2. Description of the Related Art

Digital VCR's (video cassette recorders) for recording video data and audio data on a magnetic tape in the form of digital data and reproducing these data from the magnetic tape, have been known as apparatuses of these kinds.

Since such digital VCR's can record and reproduce images having higher quality than the image quality obtained by conventional analog VCR's, it is intended to provide a digital VCR with a function of recording and reproducing still images in addition to the ordinary function of recording and reproducing moving images.

That is, when recording image data as data representing a still image, recording of a still image can be performed by recording the same photographed image data (one frame) repeatedly for a period of a plurality of frames.

When recording moving images and still images mixed together in the above-described manner, discrete portions (frames) of still-image data are present between bodies of moving-image data.

When it is intended to reproduce only still images recorded between moving images, it is necessary to perform an operation of retrieving only still-image data by skipping recorded moving-image data. Accordingly, when the user instructs to reproduce the next still image after reproducing a given still image, the user is kept waiting while the next still image is retrieved. Hence, optimum operability is not realized when reproducing a still image.

SUMMARY OF THE INVENTION

It is an object of the present invention to solve the above-described problems.

It is another object of the present invention to improve operability when reproducing a still image.

It is still another object of the present invention to provide the capability of effectively utilizing a memory.

According to one aspect, the present invention which achieves these objectives relates to a reproducing apparatus including a reproducing unit for reproducing image data from a recording medium where moving-image data and still-image data are recorded, a storage unit for storing still-image data for a plurality of different picture frames reproduced by the reproducing unit, and a memory control unit for selectively reading the still-image data for the plurality of picture frames stored in the storage unit.

According to another aspect, the present invention which achieves these objectives relates to a reproducing apparatus including a reproducing unit for reproducing image data of a first format from a recording medium, a first storage unit for storing the image data of the first format reproduced by the reproducing unit, a processing unit for obtaining image data of a second format by performing processing for the image data of the first format stored in the first storage unit, a second storage unit, and a mode setting unit for setting a mode of the apparatus from among a plurality of modes. The plurality of modes include an ordinary mode in which the first storage unit stores the image data of the first format reproduced by the reproducing unit, and the second storage unit stores the image data of the second format obtained by the processing unit, and a special mode in which the first storage unit and the second storage unit store the image data of the first format reproduced by the reproducing unit.

According to still another aspect, the present invention which achieves these objectives relates to a reproducing apparatus including a reproducing unit for reproducing image data from a recording medium where moving-image data and still-image data are recorded, a storage unit for storing the image data reproduced by the reproducing unit, and a mode setting unit for setting a mode of the apparatus from among a plurality of modes. The plurality of modes include a moving-image reproducing mode in which the reproducing unit reproduces the moving-image data and the storage unit stores the moving-image data for n picture frames (n being an integer equal to or greater than 2), and a still-image reproducing mode in which the reproducing unit reproduces the still-image data, and the storage unit stores the still-image data for m (m>n) picture frames.

According to still another aspect, the present invention which achieves these objectives relates to a data processing apparatus including a storage unit for storing first image data of a first format and second image data of a second format different from the first format, and a control unit for changing a storage area for the first image data in the storage unit in accordance with a mode of the apparatus.

According to still another aspect, the present invention which achieves these objectives relates to a reproducing apparatus including a reproducing unit for reproducing encoded image data from a storage medium where moving-image data and still-image data are recorded, a storage unit for storing the encoded image data reproduced by the reproducing unit, and a decoding unit for decoding the encoded image data stored in the storage unit. The storage unit also stores the decoded image data. The apparatus also includes a control unit for changing a storage area for the encoded image data in the storage unit in accordance with a mode of the apparatus.

According to still another aspect, the present invention which achieves these objectives relates to an apparatus for reproducing encoded image data from a recording medium where still-image data for a plurality of different picture frames are recorded together with moving-image data, and for storing the reproduced encoded image data in a memory. The apparatus has a still-image reproducing mode of automatically detecting and reproducing the still-image data for the plurality of picture frames recorded on the recording medium by controlling an operation of feeding the recording medium, and storing the reproduced still-image data for the plurality of picture frames in the memory.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 5 is a diagram illustrating the configuration of data shown in FIG. 4;

FIG. 11 is a diagram illustrating the configuration of addresses in the memory when reproducing moving images in the apparatus shown in FIG. 1; and FIG. 12 is a diagram illustrating the configuration of addresses in the memory when reproducing still images in the apparatus shown in FIG. 1.

DETAILED DESCRIPTION OF THE PREFERRED EMBODIMENT

A description will now be provided of a preferred embodiment of the present invention with reference to the drawings.

Figure 1:
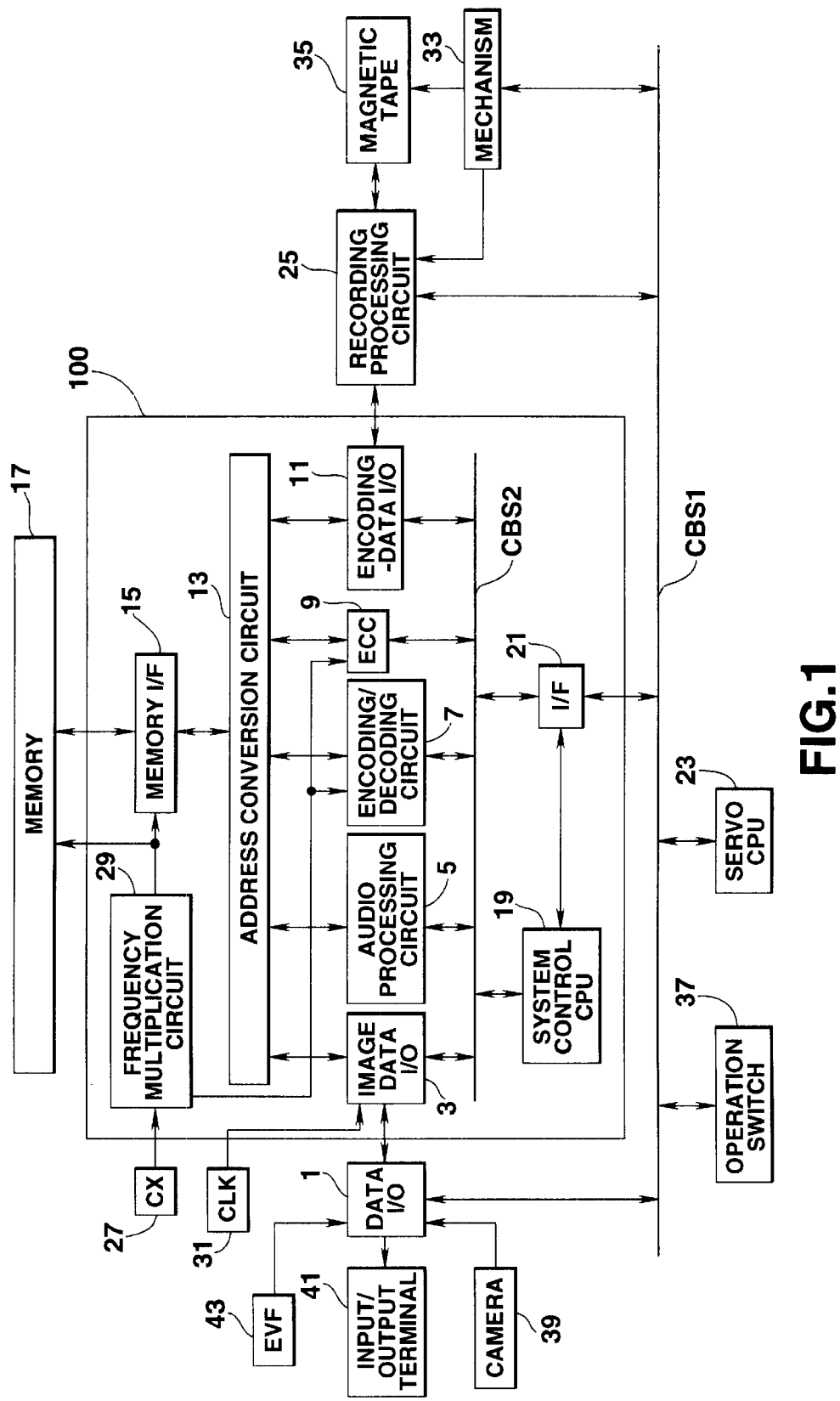
FIG. 1 is a block diagram illustrating the configuration of a digital VCR according to an embodiment of the present invention.

FIG. 1 is a block diagram illustrating the configuration of a digital VCR according to the embodiment.

In the apparatus shown in FIG. 1, each of several processing circuits accesses a memory at a desired timing, under the control of a CPU (central processing unit), and the operation of the circuit is guaranteed by adjustment of an access request of the circuit by a memory control circuit. Each processing circuit shown in FIG. 1 can process a video signal in real time. Such processing circuits are arranged in parallel, and image data is supplied to the respective processing circuits according to time sharing.

The configuration shown in FIG. 1 will now be described.

In FIG. 1, a data input/output circuit (hereinafter termed a "data I/O") 1 performs input of image data from a video camera 39 and input/output of data with an input/output terminal 41 and an electronic view finder 43 (hereinfater termed an "EVF"). An image-data input/output circuit (hereinafter termed an "image-data I/O") 3 performs various kinds of processing, such as Y/C separation processing and the like, on input data input from the camera, output data sent to the EVF, and line input data received from the terminal. An audio processing circuit 5 performs processing of audio data. An encoding/decoding circuit 7 performs compression/expansion of the amount of information of image data by performing encoding/decoding processing using well-known DCT (discrete cosine transform) and variable-length encoding on the image data.

An error correction circuit (ECC) 9 performs error correcting encoding and decoding. An encoded-data input/output circuit (hereinafter termed an "encoded-data I/O") 11 converts the format when recording encoded data and reproducing recorded data. An address conversion circuit 13 converts a request for access to a memory 17 by any of the processing circuits into an actual address in the memory. A memory interface (hereinafter termed a "memory I/F") 15 outputs a command to the memory 17 in accordance with an access request from the address conversion circuit 13. The memory 17, which comprises an SDRAM (synchronous dynamic random access memory) or the like, can perform high-speed input/output. A system control CPU 19 controls all of the processing circuits. An interface (I/F) 21 exchanges commands between a servo CPU 23 and CPU 19. The servo CPU 23 controls the feeding speed of a tape 35 and the operation of a rotating drum (not shown). A recording processing circuit 25 performs electromagnetic conversion processing of encoded data from the encoded-data I/O 11 and data reproduced from the tape 35, and has a magnetic head for performing recording/reproducing processing of data by tracing the tape 35.

An oscillator 27 ("CX") supplies a clock signal as a timing signal for each circuit. A frequency multiplication circuit 29 converts the frequency of the clock signal, output from the oscillator 27 into a frequency appropriate for each circuit, and supplies the circuit with the resultant clock signal. A reference-clock-signal oscillator 31 ("CLK") generates a reference clock signal used when the image-data I/O 3 inputs/outputs image data. A mechanism 33 includes a capstan, a capstan motor, a drum motor and the like. An operation switch unit 37 comprises various kinds of switches for reproducing, recording, fast feeding, instruction to record/reproduce a still image, and the like.

The servo CPU 23 exchanges data with the respective circuits via a bus CBS1. The control CPU 19 exchanges data with the respective circuits via a bus CBS2.

In the apparatus having the configuration shown in FIG. 1, the image-data I/O 3, the audio processing circuit 5, the encoding/decoding circuit 7, the error correction circuit 9 and the encoded-data I/O 11 are controlled by commands supplied from CPU 19 via the CBS2, and commands supplied from the servo CPU 23 via the CBS1, the interface 21 and the CBS2, and the respective circuits perform processing according to time sharing. The image-data I/O 3, the audio processing circuit 5, the encoding/decoding circuit 7, the ECC 9, the encoded-data I/O 11, the address conversion circuit 13, the memory I/F 15, the system control CPU 19, the I/F 21 and the frequency multiplication circuit 29 are configured in the form of a single I/C chip 100.

As described above, an SDRAM for performing burst transfer of data in synchronization with the rise of a clock pulse is used as the memory 17, to which a clock signal having a frequency obtained by multiplying the frequency of the clock signal supplied from the oscillator 27 is supplied.

The memory space of the memory 17 comprises a plurality of banks, and is configured by a memory region having a capacity capable of storing uncompressed image data for one frame per bank (a video memory, hereinafter termed a "VM"), and a memory region having a capacity capable of storing encoded data for one frame per bank (a track memory, hereinafter termed a "TM"). Each memory region can be set to a writing mode and a reading mode for each frame. Each of the processing circuits exchanges data with the VM or the TM in accordance with the form of data to be dealt with.

In the apparatus shown in FIG. 1, image data is processed in units of a frame, and the memory 17 has capacities of two banks and three banks for the VM and for the TM, respectively.

Next, the address space of the memory 17 to be accessed by each of the processing circuits will be described with reference to FIG. 2.

Figure 2:
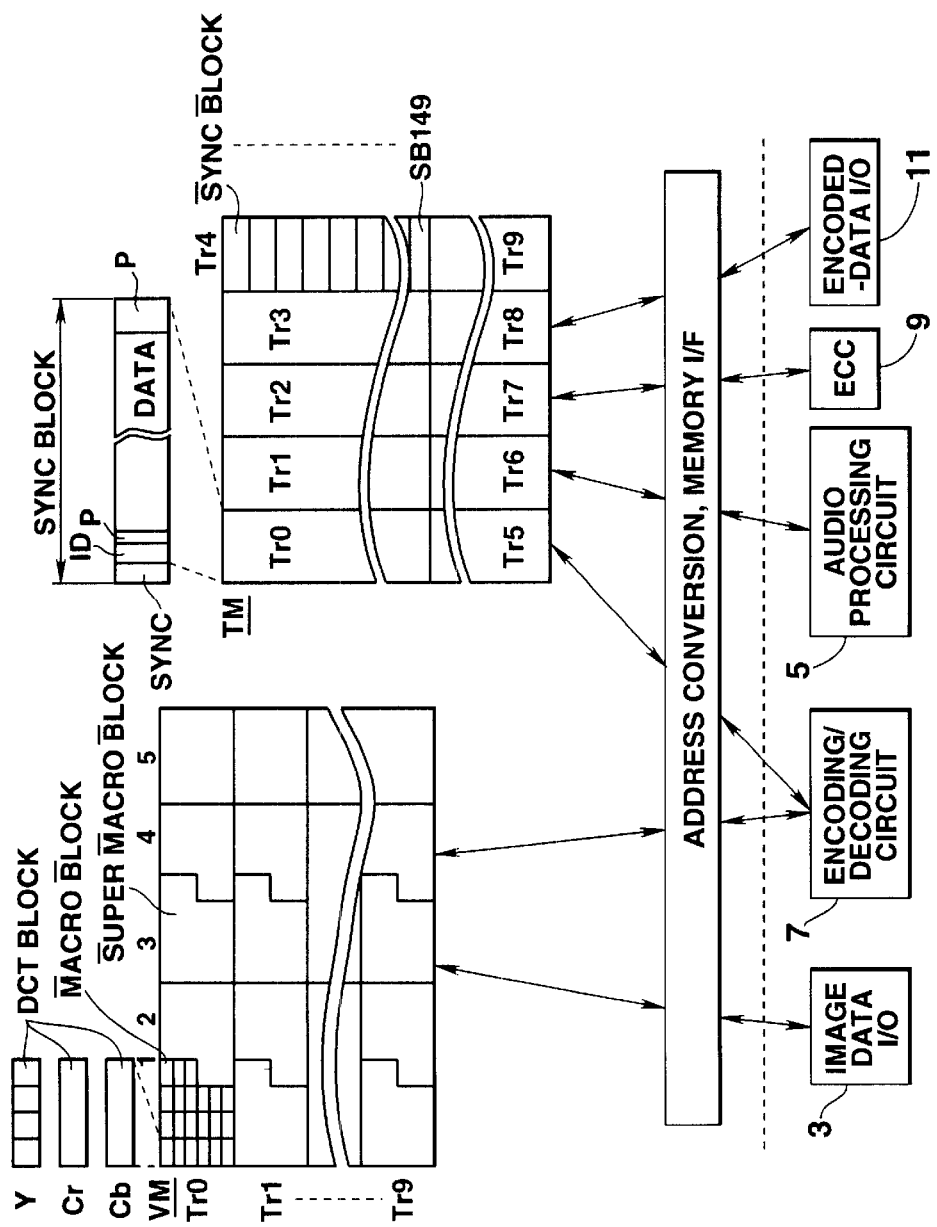
FIG. 2 is a diagram illustrating a memory space in the apparatus shown in FIG. 1.

As shown in FIG. 2, while the image-data I/O 3 principally exchanges data with the VM, the encoding/decoding circuit 7 exchanges data with the VM or the TM. Namely, in encoding processing, data is read from the VM and is encoded, and is then written in the TM. On the other hand, in decoding processing, data is read from the TM and is decoded, and is then written in the VM.

The audio processing circuit 5, the error correction circuit 9 and the encoded-data I/O principally exchange data with the TM.

Image data (Y, Cr, Cb) before being encoded is written in the VM in units of a pixel. The image data (comprising 720 pixels in the horizontal direction and 480 pixels in the vertical direction in the case of the NTSC (National Television System Committee) system) is divided into 5 blocks in the horizontal direction×10 blocks in the vertical direction, i.e., 50 supermacroblocks (hereinafter termed "SMB's"). Each SMB comprises 27 macroblocks (hereinafter termed "MB's") each comprising 4 DCT blocks for luminance data and 1 DCT block for each of two types of color-difference data. Each DCT block comprises 8 pixels in the horizontal direction×8 pixels in the vertical direction. The encoding/decoding circuit 7 performs DCT and inverse DCT in units of a DCT block.

In the present embodiment, in the case of the NTSC system, image data for one frame comprising the above-described number of pixels is recorded on 10 tracks on the magnetic tape after being encoded. At that time, data for 5 SMB's arranged in the horizontal diretion is recorded on one track.

The encoded image data, an error correcting code and the like are stored in the TM by being distributed on the above-described 10 tracks, and a plurality of sync blocks (hereinafter termed "SB's"; there are 149 SB's in the present embodiment) are stored in a region corresponding to each track.

Each SB in image data comprises synchronizing data (hereinafter termed a "sync") indicating the head of the SB, ID data (hereinafter termed an "ID") indicating each address, the attribute and the like of the data, effective data (image data in this case), and a parity code (or simply "parity") added according to error correcting encoding.

Figure 3:
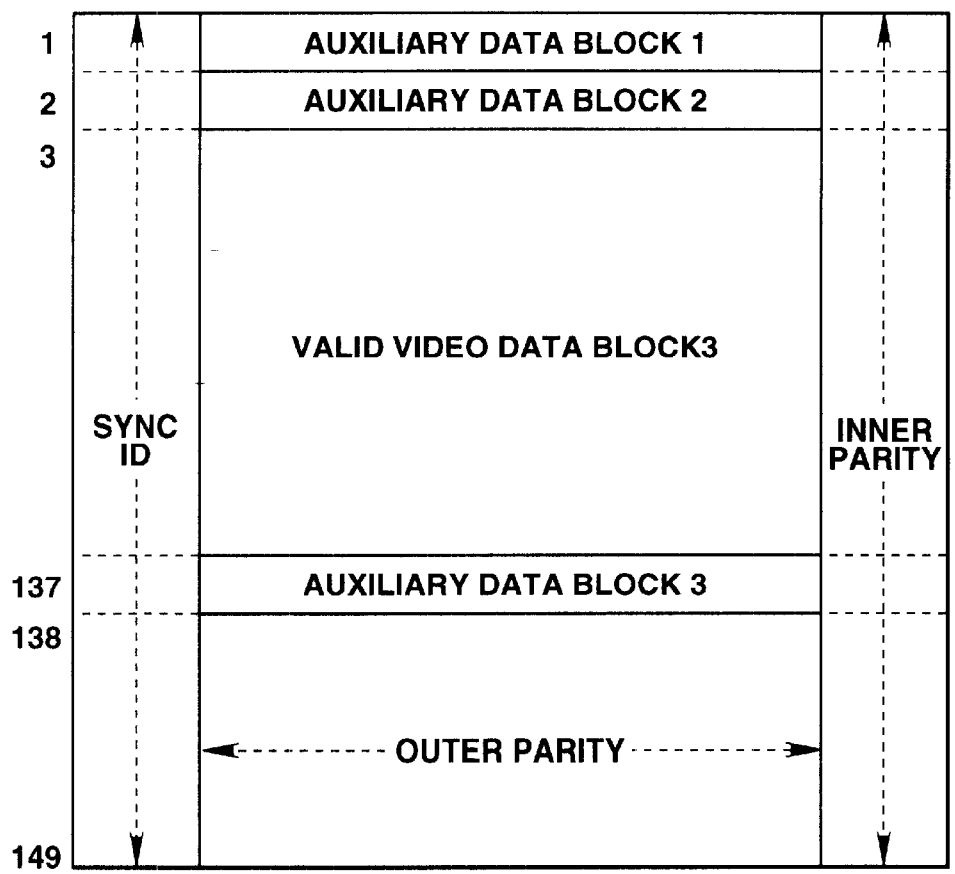
FIG. 3 is a diagram illustrating a storage format of a memory in the apparatus shown in FIG. 1.

FIG. 3 is a diagram illustrating data stored in a region for one track of the TM.

In the present embodiment, a sync and an ID are added to effective video data and an inner code parity, or to an outer code parity and an inner code parity. The data to which the sync and the ID are added constitutes 1 SB. As described above, 149 SB's constitute data for one track. 3 blocks (the 1st, 3rd and 138th SB's in FIG. 3) from among 149 SB's for one track are used as auxiliary data blocks where system data or data defined by each maker is written.

Figure 4:
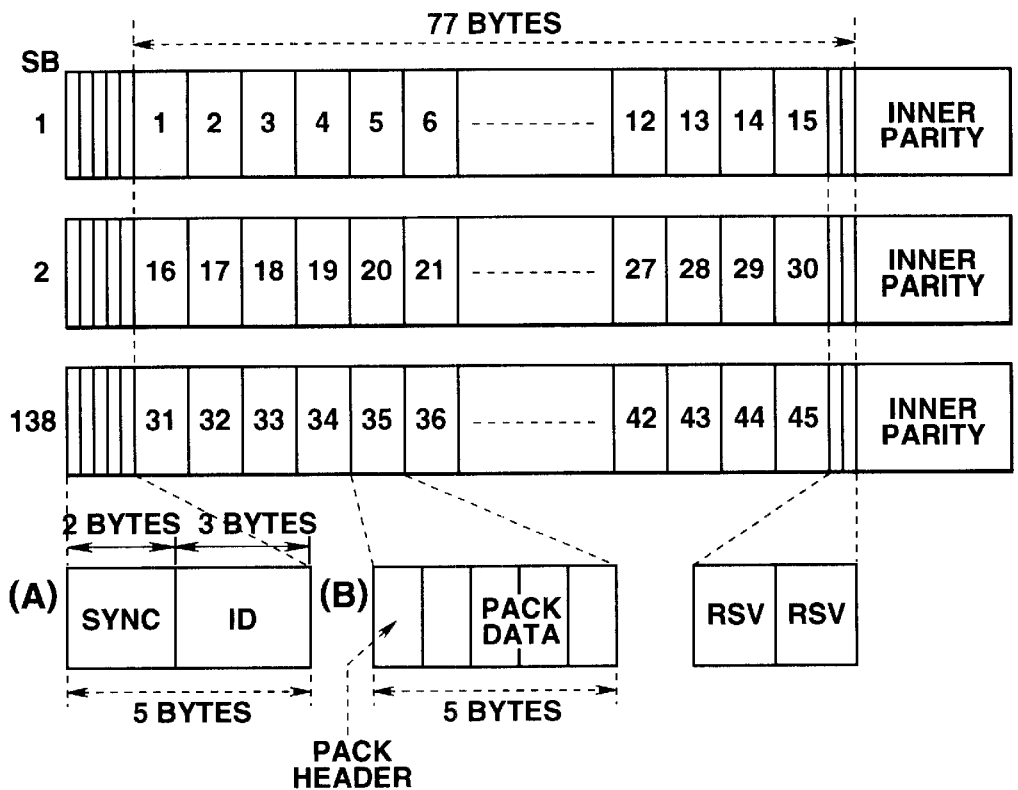
FIG. 4 is a diagram illustrating data dealt with in the apparatus shown in FIG. 1.

FIG. 4 is a diagram illustrating the configuration of the auxiliary data block shown in FIG. 3.

In FIG. 4, (A) represents 5-byte data comprising a sync and an ID, and (B) represents data grouped, for example, in a 5-byte block (hereinafter termed "pack data"). The leading 1-byte data of the pack data constitutes a pack header, and the remaining 4-byte data constitutes a data region. 15 blocks of such pack data are present within one auxiliary block, and 45 blocks of such pack data are present within one track. Discrimination between still-image data and moving-image data is performed according to this pack data.

FIG. 5 illustrates data recorded in the pack header, and the definition of each type of data.

When recording still-image data on the tape, for example, a still-image leading flag "00h" is written in the pack header of the leading video data where recording of a still image is started, still-image ending flag "02h" is recorded in the pack header of the last video data where the recording of the still image is ended, and a still-image continuing flag "01h" is recorded on the pack header of the video data where the recording of the still image is continued.

By thus writing flags indicating recording of a still image in each SB, it is possible to identify that still-image data is recorded between moving-image data.

The access of each of the processing circuits to the memory 17 is adjusted and subjected to address control by the address conversion circuit 13.

That is, when a command to assign the type of a mode, such as a reproducing mode or a recording mode, or information relating to the mode directly indicated by a predetermined bit of the address for each circuit is transmitted from the CPU's 19 and 23 via the CBS2, the address conversion circuit 13 performs scheduling relating to the priority of data transfer in accordance with the received information, and adjusts data transfer between the concerned processing circuit and the memory 17 in response to a request of access from the circuit.

The command is determined by the detection of an operational mode set through the operation switch 37 or the like by the CPU's 19 and 23, and corresponds to an operational mode, for example, an encoding mode, a decoding mode, a special reproducing mode, such as high-speed reproducing, slow reproducing or the like. Operational modes assigned by commands are not limited to the above-described ones, but also include editing operations, such as image synthesis, postrecording, insertion, dubbing and the like.

Figure 6:
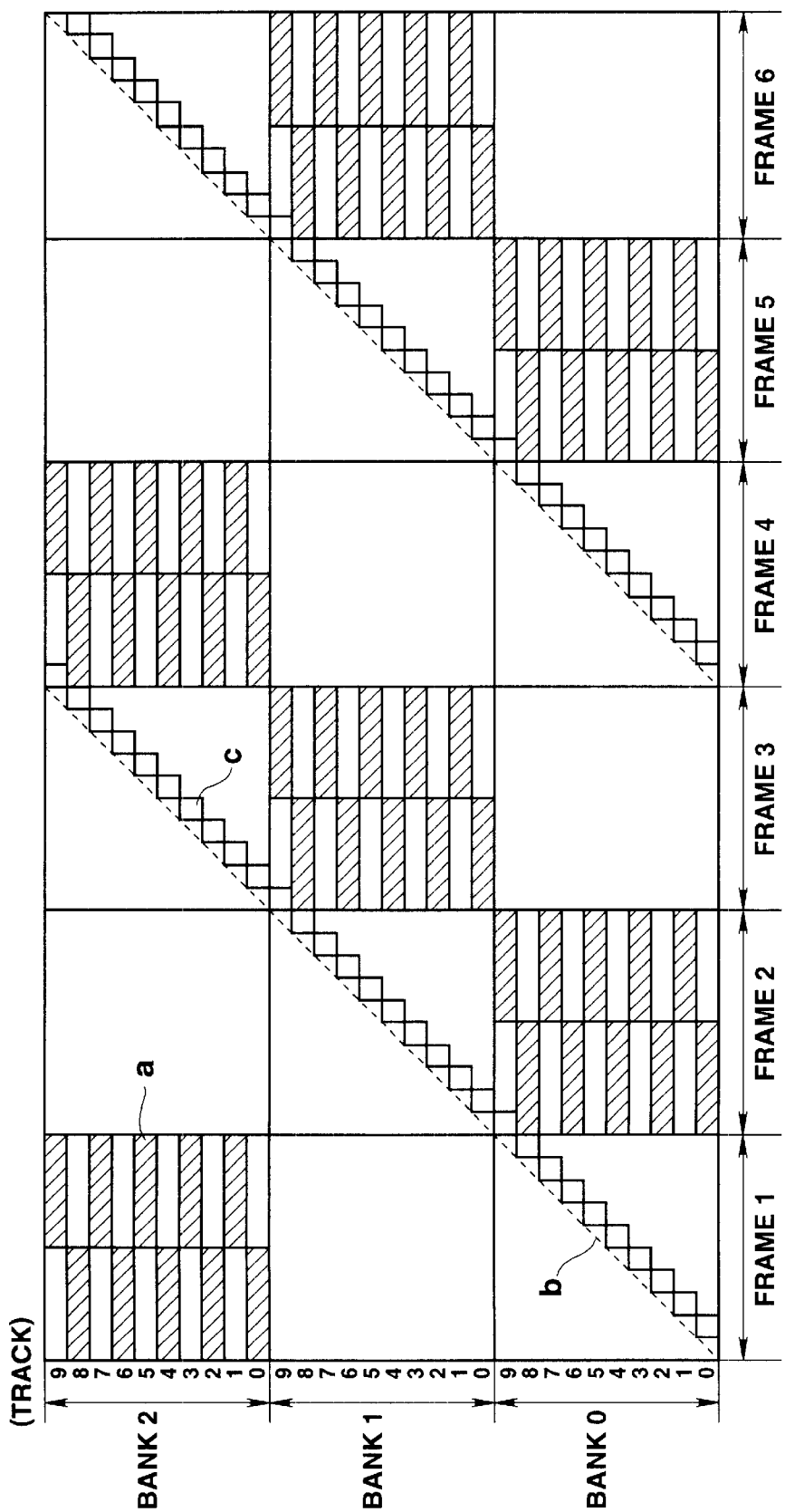
FIG. 6 is a diagram illustrating memory access timings when reproducing moving images in the apparatus shown in FIG. 1.

Next, a description will be provided of access to the memory during reproducing processing. FIG. 6 is a diagram illustrating access timings to the memory 17 for the respective procesing blocks when reproducing moving images.

In FIG. 6, the abscissa represents processing time, and the ordinate represents the address of the TM. A region "a" indicated by hatching represents an access by the encoding/decoding circuit 7, a broken line "b" represents an access by the encoded-data I/O 11, and solid lines "c" represent an access by the error correction circuit 9.

First, in the period of frame 1, the encoded-data I/O 11 sequentially writes reproduced data for 10 tracks from an address corresponding to track 0 in bank 0 of the TM in a time period corresponding to one frame.

The error correction circuit 9 sequentially reads data by accessing the region where the encoded-data I/O 11 has written the reproduced data, by being delayed by the time period of one track (1/10 frame period) from the access timing by the encoded-data I/O 11, corrects errors in the reproduced data, and rewrites the corrected data in the same addresses in the memory 17.

The encoding/decoding circuit 7 first reads data from regions where data reproduced from even-numbered tracks are stored from among data written in bank 2 not accessed by the encoded-data I/O 11, decodes the read data, and writes the resultant data in the VM. After completing decoding processing of all data in the even-numbered tracks, the encoding/decoding circuit 7 reads data from regions where data reproduced from odd-numbered tracks are stored, decodes the read data, and writes the resultant data in the VM.

Then, in the period of frame 2, the encoded-data I/O accesses bank 1, the encoding/decoding circuit 7 accesses bank 0 where error correction processing has been completed during the period of frame 1, and the same processing as that described above is performed. At that time, the encoding/decoding circuit 7 writes decoded data in a bank different from the bank of the VM where image data decoded in the preceding frame has been written (in this case, data stored in bank 2 of the TM in the period of frame 1). That is, in a moving-image reproducing mode, writing/reading of image data is alternately performed for each frame for the two banks of the VM.

Thereafter, each of the processing circuits performs processing by sequentially changing the bank to access.

Figure 7:
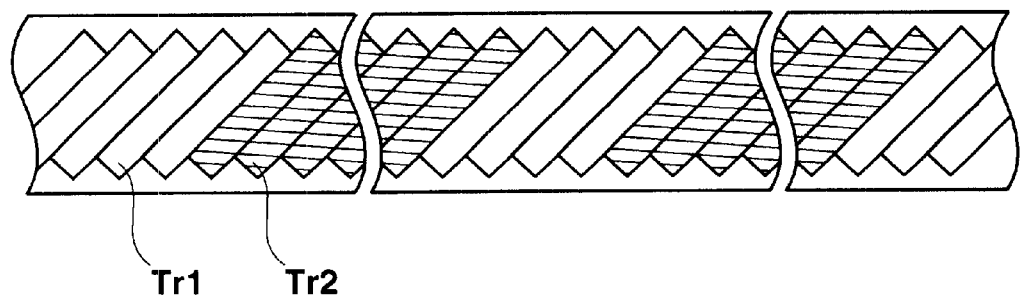
FIG. 7 is a diagram illustrating recorded data on a tape in the embodiment.

Next, a description will be provided of an operation in a still-image reproducing mode of reproducing only still images when still-image data and moving-image data are recorded on the tape in a state of being mixed as shown in FIG. 7. In FIG. 7, moving-image data is recorded on tracks Tr1, and still-image data is recorded on tracks Tr2.

Figure 8:
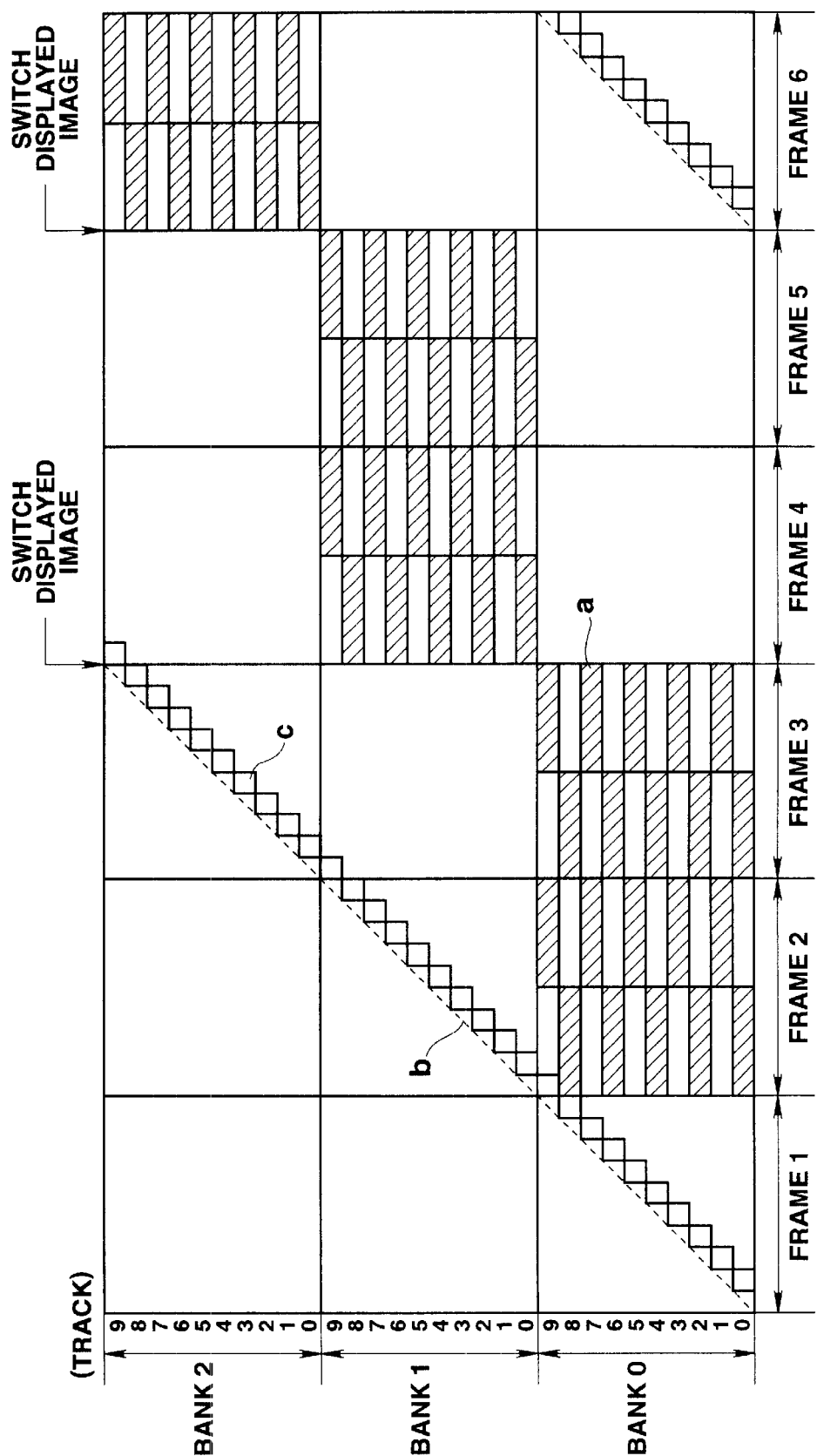
FIG. 8 is a diagram illustrating memory access timings when reproducing still images in the apparatus shown in FIG. 1.

FIG. 8 is a diagram illustrating access timings to the memory 17 for the respective processing circuits in the still-image reproducing mode. As in FIG. 6, the abscissa represents processing time, and the ordinate represents the address of the TM. A region "a" indicated by hatching represents an access by the encoding/decoding circuit 7, a broken line "b" represents an access by the encoded-data I/O 11, and solid lines "c" represent an access by the error correction circuit 9.

Figure 9:
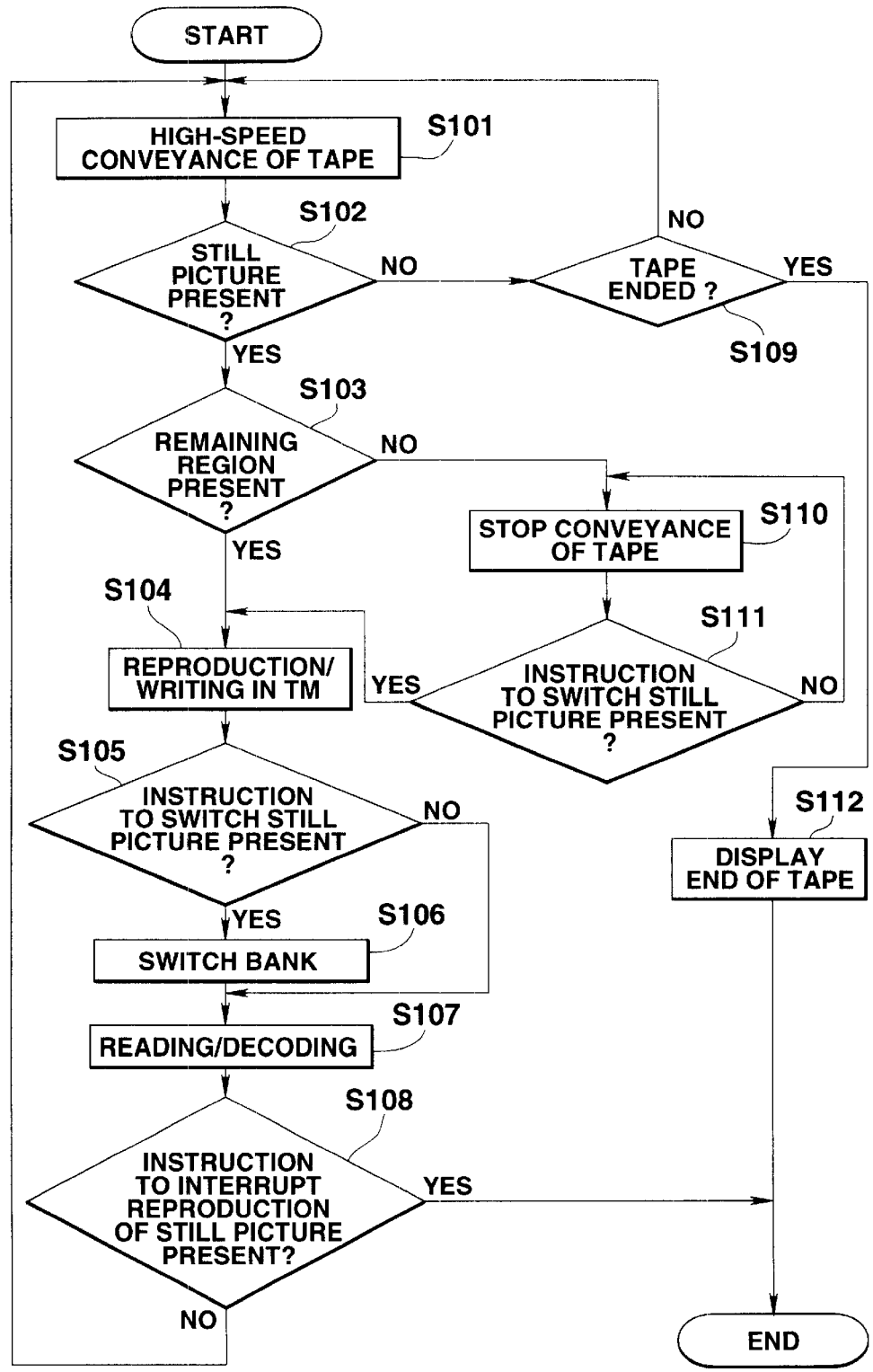
FIG. 9 is a flowchart illustrating an operation of the apparatus shown in FIG. 1.

FIG. 9 is a flowchart illustrating the control operation of the respective CPU's in the still-image reproducing mode.

When the still-image reproducing mode is assigned through the operation switch 37, the control CPU 19 controls the mechanism 33 via the servo CPU 23 to feed the tape 35 at a high speed (step S101). Then, using the above-described still-image flag recorded in the pack header of the video data, it is determined if a portion where still-image data is recorded is present in the tape 35 (step S102). (This can be done using techniques which are well known in the art.) If the result of the determination is negative, the process proceeds to step S109, where it is determined if the tape 35 has ended. If the result of the determination in step S109 is affirmative, the process proceeds to step S112, where the end of the tape is displayed on the EVF, and the process is terminated.

If the result of the determination in step S102 is affirmative, the process proceeds to step S103, where it is determined if a region capable of recording image data remains in the TM by performing detection. If the result of the determination is affirmative, the process proceeds to step S104, where still-image data is reproduced from the tape 35, and the encoded-data I/O 11 writes still-image data for one frame in bank 0 of the TM, i.e., the region of bank 0 shown in FIG. 8.

The operation of detecting a vacant region in the TM in step S103 can, for example, be realized in the following manner. That is, the system control CPU 19 incorporates 1-bit flags indicating the states of the respective banks 0–2 of the TM, and sets the flag to "1" and "0" when reproduced image data for one frame is written in each bank and when an instruction to switch the picture frame is provided as will be described later, respectively. It is thereby possible to easily determine if an area (bank) where reproduced still-image data can be written is present only by checking the states of the flags comprising three bits in total.

As in the case shown in FIG. 6, the encoded-data I/O 11 sequentially writed reproduced data for 10 tracks from an address corresponding to track 0 in bank 0 of the TM in a time period corresponding to one frame.

The error correction circuit 9 sequentially reads data by accessing the region where the encoded-data I/O 11 has written the reproduced data, by being delayed by the time period of one track (1/10 frame period) from the access timing by the encoded-data I/O 11, corrects errors in the reproduced data, and rewrites the corrected data in the same addresses in the memory 17.

The processing then awaits an instruction to switch the still image to be reproduced (decoded) (step S105). If there is an instruction to switch the still image by the operation of the operation switch 37 by the user, the bank in the TM from which still-image data is to be read is switched (step S106).

If there is no instruction to switch the still image, still-image data is read from the TM without switching the bank from which still-image data is to be read, and the read data is decoded (step S107).

It is then determined if there is an instruction to interrupt the reproduction of a still image according to the user's operation of the operation switch 37 (step S108). If the result of the determination in step S108 is negative, the tape is again fed at a high speed to retrieve the next still-image data.

If the result of the determination in step S103 is negative, i.e., if still-image data have been written in all of the three banks of the TM and there remains no region to record the detected still-image data for one frame, the feeding of the tape is stopped at that stage (step S110). The process then proceeds to step S111, where it is determined if an instruction to switch the still image to be displayed is present.

If the result of the determination in step S111 is affirmative, still-image data for one frame is read from the TM and is decoded. Upon writing of the decoded data in the VM, the next still-image data is reproduced and is written in the bank where the read still-image data for one frame has been stored.

FIG. 8 illustrates a case for describing the operation of the present embodiment in which three still images are consecutively retrieved in frame periods 1–3, an instruction to switch still-image data is provided in frame period 3, and an instruction to switch still-image data is also provided in frame period 5.

That is, in FIG. 8, in the period of frame 2, the encoding/decoding circuit 7 first reads data written in bank 0 during the period of frame 1 from a region where reproduced data from even-numbered tracks are stored and decodes the read data. Upon completion of decoding processing for all data on the even-numbered tracks, data is read from a region where reproduced data from odd-numbered tracks is stored, and the read data is decoded.

Upon detection of the next still-image data in frame period 2, reproduced still-image data is written in bank 1. At that time, however, since no instruction to switch the still image is present, the encoding/decoding circuit 7 also reads still-image data stored in bank 0 and decodes the read data in frame period 3.

Then, if there is an instruction to switch the still image in frame period 3, the bank from which still-image data is to be read is switched in frame period 4, and the encoding/decoding circuit 7 reads still-image data from bank 1 and decodes the read data.

For example, if there is no instruction to switch the still image even after frame period 6 after the first still-image data has been written in bank 0, the encoding/decoding circuit 7 repeatedly reads and decodes still-image data from bank 0, and the servo CPU 23 controls the mechanism 33 so as to stop the feeding of the tape until an instruction to switch the still image is present after still-image data has been written in bank 2.

Actually, a time period corresponding to several tens to several hundreds of frame periods is required before the next still-image,data is detected after detecting one still-image data, the encoding/decoding circuit 7 repeatedly reads and decodes still-image data from an instructed bank during this time period.

As described above, in the present embodiment, since different still-image data are written in the three banks of the TM, and still-image data to be decoded is switched in accordance with switching of the still image to be displayed, delay time (waiting time) in displaying processing can be reduced even when retrieving and sequentially displaying only still images.

Furthermore, since, even when still-image data for three frames have already been written in the TM, the next still-image data is written after switching the still image, it is possible to always store still-image data for three frames, and to immediately display the next still image even when instructions to switch the still image twice are provided twice before the next still image is detected.

In the present embodiment, still-image data is repeatedly read from the same bank of the TM and is decoded until an instruction to switch the still image is provided. However, since still-image data in bank 0 is decoded and is stored in the VM during the period of frame 2 shown in FIG. 8, decoded still-image data may thereafter be read from the VM, and still-image data for the first picture frame after switching of the still image may be read from the TM.

A description will now be provided of an access to the memory 17 when obtaining a still image by repeatedly reading image data for one frame from the VM as described above.

Figure 10:
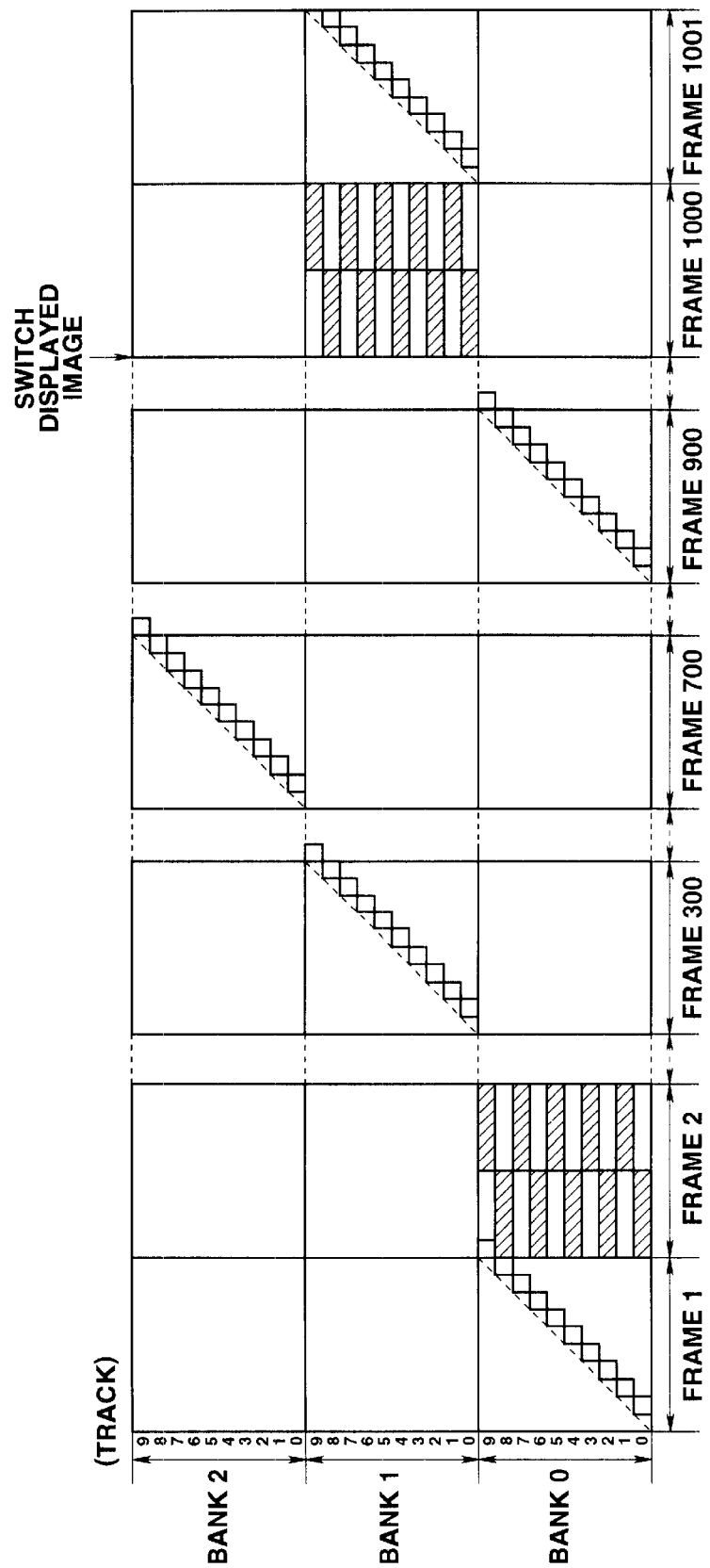
FIG. 10 is a diagram illustrating another example of memory access in a still-image reproducing mode in the apparatus shown in FIG. 1.

FIG. 10 is a diagram illustrating an access of each circuit to the memory 17 in the present embodiment.

In FIG. 10, first, still-image data for one frame detected during the period of frame 1 is written in bank 0. Then, the ECC circuit 9 performs error correction processing for the still-image data stored in bank 0. Then, in the period of frame 2, the encoding/decoding circuit 7 reads still-image data in bank 0 in the sequence of an odd-numbered track and an even-numbered track in the above-described manner and decodes the read data, and writes the decoded data in the VM. At that time, either bank 0 or bank 1 may be used as the bank of the VM where the data is written. In the still-image reproducing mode, only one of the banks may be used.

After writing still-image data for one frame in bank 0 in the period of frame 1, each CPU retrieves the next still image. During this time period, still-image data for one frame decoded and written in the VM in the period of frame 2 is repeatedly read by the image-data I/O 3 and is displayed on EVF or an external monitor via the data I/O 1.

When the next still-image data is detected in the period of frame 300, the detected still-image data is written in bank 1, and error correction processing is performed.

After writing the still-image data for one frame in bank 1 in the period of frame 300, the next still-image data is retrieved. At that time, since an instruction to switch the displayed image by the user is not yet present, still-image data for one frame decoded in the period of frame 2 is read from the VM.

When the next still-image data is detected in the period of frame 700, the detected still-image data for one frame is written in bank 2, and error correction processing is performed. Then, the next still-image data is retrieved in the same manner. Now, suppose that the next still-image data is detected in the period of frame 900.

In this case, since data in bank 0 has already been decoded in the period of frame 2, still-image data for one frame is again written in bank 0 in the period of frame 900, error correction processing is performed, and the next still image is retrieved.

When the next still-image data is detected before an instruction to switch the display picture frame is provided (between the period of frames 901–1000 in the case of FIG. 10) after writing still-image data for one frame in the period of frame 900, since three still image data have already been written in the three banks of the TM, the feeding of the tape is stopped at that position.

When there is an instruction to switch the display picture frame in the period of frame 1000, the encoding/decoding circuit 7 reads still-image data for one frame from bank 1, decodes the read data, and writes the decoded data in the VM.

When the still-image data in bank 1 is decoded in the period of frame 1000, the tape is again fed, and still-image data for one frame already detected before the period of frame 1000 is written in bank 1 in the period of frame 1001, and error correction processing is performed.

As described above, in the case shown in FIG. 10, since decoding processing is performed only once for image data of each bank when a still image is displayed, and then still-image data for one frame is repeatedly read from the VM, it is unnecessary to operate the encoding/decoding circuit 7 while data is read from the VM.

In the present embodiment, since the above-described TM and VM are disposed in the same memory 17, it is possible to change the capacities of the TM and the VM when moving images are reproduced and when still images are reproduced, and to improve the operability of the apparatus.

FIG. 11 is a diagram illustrating the configuration of addresses in the memory 17 when reproducing moving images.

Addresses are allocated to bank 0 of the VM, bank 1 of the VM, bank 0 of the TM, bank 1 of the TM, and bank 2 of the TM in the sequence from lower addresses.

Consider a case of switching from the moving-image reproducing mode to the still-image reproducing mode. In the moving-image reproducing mode, it is necessary to reproduce image data by alternately using bank 0 and bank 1 of the VM. However, as described above, in the still-image reproducing mode, decoded image data for the same frame may be repeatedly output from the VM. Hence, one of the two banks of the VM becomes unnecessary.

Accordingly, by allocating the one unnecessary bank of the VM as the TM, the number of banks of the TM can be increased when displaying only still images by retrieving still-image data in the above-described manner.

This operation will now be described with reference to FIG. 12.

The control CPU 19 prohibits writing of decoded image data in one of the banks of the VM (bank 0 in the present case) in response to switching from the moving-image reproducing mode to the still-image reproducing mode by the operation of the operation switch 37, and repeatedly reads decoded image data from bank 0, and at the same time shifts to an operation of retrieving still-image data in the above-described manner.

In the address configuration of the memory 17, the number of banks of the VM is decremented by one, and the number of banks of the TM is incremented by three. More specifically, in the moving-image reproducing mode, addresses in bank 1 of the address configuration shown in FIG. 11 are allocated as addresses in bank 3–bank 5 of the TM as shown in FIG. 12.

By thus allocating unnecessary banks of the VM to the TM in the still-image reproducing mode, it is possible to write more still-image data in the TM, and to shorten waiting time until display even when still images are sequentially switched and displayed.

Although in the present embodiment, capacities of two frames and three frames are provided for the VM and for the TM, respectively, the present invention is not limited to such capacity values. That is, the TM may have at least two banks, and the VM may have any number of banks. Particularly, as the number of banks of the VM increases, the operability can be further improved.

That is, in the still-image reproducing mode, a capacity for only one frame may remain for the VM, and all of remaining portions of the VM can be used as the TM.

In the present embodiment, the present invention is applied to a still-image reproducing mode of reproducing only still images in a digital VCR. However, the present invention may also be applied to a case of reproducing or processing only data of a predetermined format from among data of a plurality of formats, and the same effects can also be obtained.

As is apparent from the foregoing description, even when sequentially reproducing still images by storing still-image data for a plurality of picture frames in storage means and selectively reading the stored data, waiting time until a still image is reproduced can be shortened.

According to the present embodiment, by changing the storage region between the moving-image reproducing mode and the still-image reproducing mode, it is possible to store a larger amount of encoded image data, for example, by expanding the storage region for encoded data in the still-image reproducing mode, and to shorten waiting time until a still image is reproduced even when sequentially reproducing still images.

Furthermore, since the storage region for data having a predetermined format is changed in accordance with the mode, it is possible to provide an optimum environment for the use of a memory in accordance with the mode and the format of data to be processed.

That is, for example, by reducing the storage region for data of an unnecessary format in a particular mode, it is possible to expand the storage region for data of a necessary format.

The individual components designated by blocks in the drawings are all well-known in the image-data reproducing apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reproducing apparatus comprising:
   a reproducing unit that reproduces image data from a recording medium where moving-image data are recorded;
   a storage having a capacity capable of storing the image data of a plurality of picture frames reproduced by said reproducing unit, said storage storing the still-image data of a plurality of different picture frames representing different images reproduced by said reproducing unit;
   a searching unit that searches the still image data in the image data reproduced by said reproducing unit and writes a plurality of picture frames of the searched still image data in said storage; and
   a memory control unit that selects one picture frame from the plurality of different picture frames represented by the still-image data searched by said searching unit and written in said storage, and reads the still-image data of the selected picture frame from said storage.

2. An apparatus according to claim 1, wherein the image data comprises encoded image data, and further comprising a decoding unit that decodes the still-image data read from said storage, wherein said storage also stores the still-image data decoded by said decoding unit.

3. An apparatus according to claim 2, wherein said storage stores the encoded image data and the image data decoded by said decoding unit in different areas.

4. An apparatus according to claim 1, wherein said searching means comprising a detection unit that detects the still-image data from among the image data reproduced by said reproducing unit, a feeder, arranged to feed the recording unit, and a feeding control that controls a feeding operation of said feeder in accordance with a result of detection by said detection unit.

5. An apparatus according to claim 1, further comprising a manual operation component, wherein said memory control reads still-image data stored in said storage in accordance with an operation of said manual operation component.

6. A reproducing apparatus, comprising:
   a reproducing unit adapted to reproduce image data of a first format from a recording medium, the image data comprising moving-image data and still image data;
   a first storage for storing the image data of the first format reproduced by said reproducing unit;
   a processor adapted to obtain image data of a second format by performing processing for the image data of the first format stored in said first storage;
   a second storage; and
   a mode setter, that sets a mode of said apparatus from among a plurality of modes, the plurality of modes comprising (1) an ordinary mode, in which said first storage stores the image data of the first format comprising the moving-image data and the still image data reproduced by said reproducing unit, and said second storage stores the image data of the second format including the moving image data and the still image data obtained by said processor, and (2) a still image searching mode, in which said reproducing unit searches the still image data in the image data of the first format reproduced from the recording medium and said first storage and said second storage store the still image data of the first format searched by said reproducing unit.

7. An apparatus according to claim 6, wherein the image data of the first format comprises encoded image data, and wherein said processor comprises a decoder, for decoding the encoded image data.

8. An apparatus according to claim 7, wherein the image data of the second format comprises image data decoded by said decoder.

9. An apparatus according to claim 6, wherein said first storage and said second storage are configured as a single memory circuit.

10. A reproducing apparatus operable in at least a normal reproducing mode and a still-image reproducing mode, said reproducing apparatus comprising:

reproducing means for reproducing encoded image data from a recording medium where moving-image data and still-image data are recorded, said reproducing means searching the still-image recorded in the recording medium in a still-image reproducing mode;

storage means for storing the encoded image data reproduced by said reproducing means, said storage means having a first area and a second area;

decoding means for decoding the encoded image data stored in said storage means and for outputting the decoded image data to said storage means, said storage means also storing the decoded image data; and control means for controlling a storage operation of said storage means in accordance with an operating mode of said apparatus, said control means controlling said storage means so as to store the encoded image data of the moving-image and the still-image in the first area and to store the decoded image data of the moving-image and the still-image in the second area in the normal reproducing mode, and to store the encoded image data of the still-image searched by said reproducing means in the first and second areas in the still-image reproducing mode.

11. An apparatus for reproducing encoded image data from a recording medium where still-image data for a plurality of different picture frames are recorded together with moving-image data, and for storing the reproduced encoded image data in a memory which has a capacity capable of storing the encoded image data of a plurality of picture frames, said apparatus having a still-image reproducing mode of automatically searching and reproducing the still-image data of the plurality of different picture frames indicating different images recorded on the recording medium, storing the searched still-image data of the plurality of different picture frames in the memory, and reading the still-image data of a selected one picture frame of the plurality of different picture frames represented by the still-image data stored in the memory from the memory.

12. An apparatus for receiving a data train of encoded image data where still-image data for a plurality of different picture frames are multiplexed with moving-image data, and for storing the encoded image data in a memory which has a capacity capable of storing the encoded image data of a plurality of picture frames, said apparatus having a still-image processing mode of automatically searching the still-image data of the plurality of different picture frames indicating different images from the received data train, storing the searched still-image data of the plurality of different picture frames in the memory, and reading the still-image data of a selected one picture frame of the plurality of different picture frames represented by the still-image data stored in the memory from the memory.

13. A reproducing apparatus, comprising:

a reproducing unit that reproduces image data from a recording medium where moving-image data and still image data are recorded;

a searching unit that searches the still image data in the image data recorded on the recording medium;

a memory control unit that writes the still image data searched by said searching unit into a storage having a capacity capable of storing the still image data of a plurality of picture frames reproduced by said reproducing unit, said storage storing the searched image data of a plurality of different picture frames each representing a different still image; and a manual operation component that indicates changing of the still image to be read out from said storage, wherein said memory control unit selects one picture frame from the plurality of different picture frames represented by the still image data stored in said storage and reads the still image data of the selected one picture frame from said storage, said memory control means changing the one picture frame to other picture frame in the plurality of different picture frames represented by the image data stored in said storage in response to an instruction by said manual operation component.

14. An apparatus according to claim 13, wherein the image data comprises encoded image data, and said memory control unit writes the encoded image data reproduced by said reproducing unit into the storage.

15. An apparatus according to claim 14, further comprising decoding unit that decodes the encoded image data of the selected picture frame read out from the storage.

* * * * *

UNITED STATES PATENT AND TRADEMARK OFFICE
CERTIFICATE OF CORRECTION

PATENT NO.     : 6,490,407 B2
DATED          : December 3, 2002
INVENTOR(S)    : Mitsuo Niida It is certified that error appears in the above-identified patent and that said Letters Patent is hereby corrected as shown below:

Column 4,
Line 16, "signal," should read -- signal --.

Column 5,
Line 27, "diretion" should read -- direction --.

Column 7,
Line 65, "writed" should read -- writes --.

Column 12,
Line 2, "apparatus" should read -- apparatus, --.
Line 4, "data" should read -- data and still-image data --.
Line 32, "unit," should read -- medium, --.

Signed and Sealed this

Twelfth Day of August, 2003

JAMES E. ROGAN
*Director of the United States Patent and Trademark Office*